US 6,724,529 B2

(12) United States Patent
Sinkoff

(10) Patent No.: US 6,724,529 B2
(45) Date of Patent: Apr. 20, 2004

(54) REFLECTION-TYPE PROJECTION SCREENS

(76) Inventor: Howard Sinkoff, 2741 NE. 4th Ave., Pompano Beach, FL (US) 33065

( * ) Notice: Subject to any disclaimer, the term of this patent is extended or adjusted under 35 U.S.C. 154(b) by 27 days.

(21) Appl. No.: 10/125,628

(22) Filed: Apr. 17, 2002

(65) Prior Publication Data

US 2003/0197932 A1 Oct. 23, 2003

(51) Int. Cl.⁷ .................. G03B 21/56; G03B 21/60; G02B 27/10
(52) U.S. Cl. .................. 359/443; 359/449; 359/455; 359/459; 359/619; 359/627
(58) Field of Search .................. 359/443, 449, 359/455, 459, 619, 627

(56) References Cited

U.S. PATENT DOCUMENTS

| | | | | |
|---|---|---|---|---|
| 1,985,460 A | * | 12/1934 | Raven | 359/445 |
| 2,480,031 A | * | 8/1949 | Kellogg | 359/457 |
| 2,968,219 A | * | 1/1961 | Saiia | 359/443 |
| 3,263,561 A | * | 8/1966 | Jackson | 359/451 |
| 3,314,742 A | * | 4/1967 | Morgan | 359/443 |
| 3,492,060 A | | 1/1970 | Sherwood | 359/443 |
| 3,510,197 A | | 5/1970 | Seki et al. | 359/461 |
| 3,598,470 A | | 8/1971 | Vetter | 359/455 |
| 3,653,740 A | | 4/1972 | Ogura et al. | 359/443 |
| 3,964,822 A | * | 6/1976 | Yamashita | 359/443 |
| 4,006,965 A | | 2/1977 | Takada et al. | 359/443 |
| 4,025,160 A | | 5/1977 | Martinez | 359/443 |
| 4,040,717 A | * | 8/1977 | Cinque et al. | 359/454 |
| 4,089,587 A | | 5/1978 | Schudel | 359/451 |
| 4,190,320 A | | 2/1980 | Ferro | 359/459 |
| 4,201,449 A | | 5/1980 | Campion et al. | 359/443 |
| 4,232,939 A | | 11/1980 | Kikuchi | 359/459 |
| 4,431,720 A | | 2/1984 | Sugarman | 430/17 |
| 4,792,209 A | | 12/1988 | Laine et al. | 359/443 |
| 5,148,309 A | | 9/1992 | Yamada et al. | 359/443 |
| 5,361,163 A | | 11/1994 | Matsuda et al. | 359/452 |
| 5,456,967 A | | 10/1995 | Nezu | 428/141 |
| 5,780,140 A | * | 7/1998 | Nilsen | 428/172 |
| 5,914,825 A | | 6/1999 | Nishio et al. | 359/851 |
| 6,040,941 A | | 3/2000 | Miwa et al. | 359/443 |
| 6,144,491 A | | 11/2000 | Orikasa et al. | 359/452 |
| 6,163,402 A | | 12/2000 | Chou et al. | 359/443 |
| 6,233,095 B1 | | 5/2001 | Niwa et al. | 359/443 |

* cited by examiner

Primary Examiner—Russell Adams
Assistant Examiner—Magda Cruz
(74) Attorney, Agent, or Firm—Kevin P. Crosby, Esq.; Daniel C. Crilly, Esq.

(57) ABSTRACT

A projection screen comprising; a substrate having a generally flat forward surface; a diffusion layer formed of a plurality of generally equally spaced apart concave features forming micro lenses; a layer of reflective material deposited on a rearward facing surface of the diffusion layer; the diffusion layer laminated to the forward facing surface of the substrate so that the layer of reflective material is sandwiched therebetween.

20 Claims, 3 Drawing Sheets

REFLECTION-TYPE PROJECTION SCREENS

BACKGROUND OF THE INVENTION

1. Field of the Invention

This invention relates to reflection-type projection screens. More particularly, the invention relates to reflection-type projection screens having excellent reflection directivity in the horizontal and vertical directions yet which produce a reflected image having superior gain contrast.

2. Description of the Prior Art

The desirability of producing reflection-type projection screens having a wide angle of reflectivity with suitable contrast is well known. In settings such as movie theaters and home viewing areas, the viewer is often times positioned at a significant angle with respect to the direction of the projected image from the projector, i.e. the direction of incident projected light. Therefore, the screen must have an effective viewing angle greater than would be producible if a reflective medium were used alone.

Numerous attempts have been made to remedy this problem. U.S. Pat. No. 3,653,740 to Ogura ("'740 Patent") discloses a projection screen having a double rolled aluminum foil sheet attached to a support member, and a brushed resin film covering the foil as a protective coating against scratching, fingerprints, etc. No mention is made of the brushing techniques used or of the resulting surface characteristic of the resin film after it is brushed.

U.S. Pat. No. 6,144,491 to Orikasa ("'491 Patent") discloses a reflection-type projection screen having a substrate, a light reflecting layer made from a transparent resin in which flakes of a light-reflective material are dispersed, and a transparent light-diffusing layer made from a transparent resin in which fine crystalline particles of calcite and a pigment are dispersed. The films of '491 Patent are complicated, expensive and particularly difficult to achieve.

U.S. Pat. No. 6,040,941 to Miwa ("'941 Patent") discloses a reflection-type projection screen having a light-reflecting substrate laminated to a light-transmitting polymer layer having light absorptive slits or "crazes" of regular directionality disposed therein. The slits are filled with a light-absorbing substance such as a black pigment or dye.

U.S. Pat. No. 6,233,095 B1 to Niwa ("'095 Patent") discloses a reflex-type screen comprised of a first layer formed integrally with an inner reflex layer on a surface of a substrate, and a second layer formed of a deflection film bonded to a surface of the first layer. The screen of the '095 Patent was developed to facilitate the use of screens which can be deflected, e.g. rolled up when not in use. Beads such as acrylic or silicon beads are applied to the substrate surface prior to deposition of a metal reflective layer, rendering the process of attaching the metal reflective layer all the more complicated.

U.S. Pat. No. 5,456,967 to Nezu ("'967 Patent") discloses a reflection-type screen of the type that can be wound up in a roll form and unwound as needed and comprises a substrate sheet to which is laminated a high-density light diffusion-reflection layer and a translucent light diffusion layer including a soft vinyl chloride sheet, the translucent light diffusion layer having a surface provided with a light-diffusing fine uneven pattern.

U.S. Pat. No. 5,361,163 to Matsuda ("'163 Patent") discloses a reflection-type projection screen comprising a dark plastic substrate, a fibrous sheet of glass fibers, a white, opaque base material sheet and a light diffusing layer of a translucent plastic onto which a lustrous pigment or calcite powder is incorporated. An emboss is formed on the outer surface of the light diffusion layer. Light absorbing strips are provided each at a position corresponding to a concave portion of the emboss on the surface of the base material sheet adjoining the light diffusing layer.

U.S. Pat. No. 5,148,309 to Yamada ("'309 Patent") discloses a reflective type screen comprising a reflective surface layer, a polarizing plate layer in position in front of the reflective surface layer, and a diffusion layer located in front of the polarized plate layer, wherein the reflective surface layer, the polarizing plate layer and the diffusion layer are laminated together using an adhesive to form an integral structure. Additional embodiments are disclosed in the '309 Patent, all of which require a polarizing layer, perhaps to accommodate exotic applications of projection images onto a screen.

U.S. Pat. No. 4,232,939 to Kikuchi ("'939 Patent") discloses a transparent base plate to which is attached on one side an aluminum mirror surface and on the other side a diffusing specular layer of low diffusing performance. The diffusing performance of the diffusing specular layer can be adjusted as desired while the reflection performance of the mirror surface is constant. The diffusing specular layer is formed with a plurality of elongated columnar lenticles having convex surfaces facing the viewer. The curvature of the lenticles is determined by the distance between the screen and the viewers. The outer convex surface of the lenticles is treated by sandblasting. The lenticles are arranged in a vertically elongated pattern, which sacrifices vertical directivity.

U.S. Pat. No. 4,201,449 to Campion ("'449 Patent") teaches a front projection screen having a substrate, a reflective aluminum ink coating applied to a surface of a substrate, and a protective coating, preferably of a clear acrylic having a gloss finish for the purpose of protecting the reflective film. The disclosure specifies that the coating reduces somewhat the reflective efficiency of the screen. Therefore, the directionality of such a screen is likely to be extremely narrow.

U.S. Pat. No. 4,190,320 to Ferro ("'320 Patent") teaches a front projection screen having two reflecting layers separated by a light transmissive layer, and a light-diffusing surface coating provided on the frontmost reflecting layer. The screen forms an embossed pattern across its front surface.

U.S. Pat. No. 4,089,587 to Schudel ("'587 Patent") discloses a projection screen having a film which is constructed of a partially deformable, resilient material. One surface of the film has in combination a random matte texture and a substantially unidirectional striated, i.e. grooved, texture. A layer of reflective material is deposited on the above-mentioned surface of the film to provide a high gain, damage resistant reflective surface. The screen of the '587 Patent is intended to be of the double-coverture type, i.e. curved about at least two axes so as to focus the reflected image in a confined area. Another embodiment of the '587 Patent discloses a flat screen. Striations are provided, usually vertically aligned to disburse the light reflected off of the reflective film. The arrangement of the striations or lenticles as vertical grooves limits the directionality to nearly a side by side viewing field and not top to bottom or diagonal.

SUMMARY OF THE INVENTION

It is therefore, an object of this invention to provide a front projection screen which overcomes the aforementioned disadvantages and shortcomings.

It is also an object of this invention to provide a front projection screen which provides the same directionality, i.e. directivity, along vertical as well as horizontal axes relative to a normal line passing perpendicularly through the center of the projection screen.

It is a further object of this invention to provide a projection screen which is simple and inexpensive to manufacture and light weight yet which provides directivity characteristics not heretofore experienced.

In accordance with these and other objects, the invention is directed to a projection screen comprised of a reflective film laminated, as by the use of adhesive, metal deposition, or otherwise as will occur to those of skill in the art, to a light diffusing layer on one side and, on another side, as by adhesive, metal deposition, or other techniques known to those of skill in the art, to a substrate. The substrate may be rigid or flexible, flat or curved.

The reflective film may be vacuum metalized silver or vacuum metalized aluminum or any other film exhibiting a high coefficient of reflectivity. The characteristics of the light diffusing layer can be adjusted depending upon the desired effect, intensity of projected image light, ambient conditions, etc. One form of the diffusing layer is an embossed film. One form of such embossed film contains a plurality of concavities embossed in the film which act as micro lenses. The surface characteristics, e.g. concavities, associated with the light diffusing layer can be formed by techniques such as hot roll stamping, ultra etching or the like.

The reflective layer may be adhered to the substrate or to the substrate-facing inner surface of the light diffusing layer.

It can therefore be appreciated that one embodiment of the invention is to a projection screen comprising a substrate having a generally flat forward surface; a diffusion layer formed of a plurality of generally equally spaced apart concave features forming micro lenses; a layer of reflective material deposited on a rearward facing surface of the diffusion layer; the diffusion layer laminated to the forward facing surface of the substrate so that the layer of reflective material is sandwiched there between.

These and other objects and features of the invention will be more readily understood from a consideration of the following detailed description, taken with the accompanying drawings, in which corresponding parts are indicated by corresponding numerals.

DETAILED DESCRIPTION OF THE PREFERRED EMBODIMENT

Figure 1:
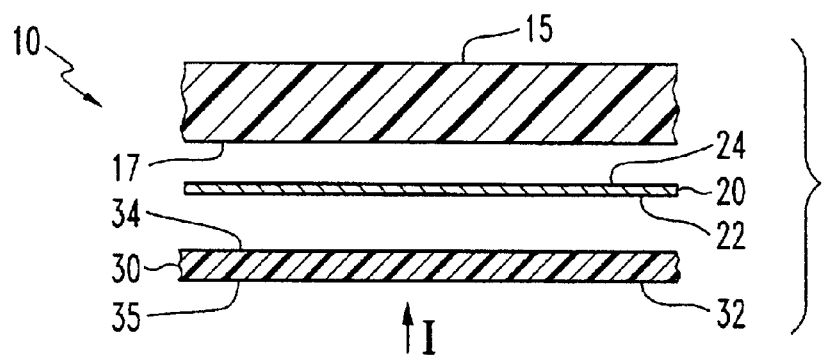
FIG. 1 is a cross-sectional, elevational, exploded view of a generalized embodiment of the invention.

Referring now to the drawings, the screen of the first embodiment of the invention is indicated by the reference numeral 10 and includes a substrate 15, which may be planar or curved depending upon the requirements of the particular application, and which, in the preferred embodiment, is of the rigid foam core variety with plastic sheet panels on both sides for rigidity. Although the screen of this invention can be used for any front projected image, it is particularly suitable for use with LCD projection or DLP and the like projection systems. The substrate is commonly found in, and is preferably in, the thickness range of between ¼ inch and 2 inches. The thickness of the substrate 15 is dictated by such parameters as strength requirements for a given size of screen, the environment in which the screen will be used, etc. The substrate defines a forward-facing or front surface 17

A reflective, preferably metalized, film layer 20 is included, which defines a forward facing, reflective, surface 22 and a rear surface 24 adapted to be connected to or placed adjacent to, surface 17 of substrate 15.

A light diffusing layer 30 is employed which sandwiches the reflective layer 20 between light diffusing layer 30 and front surface 17 of substrate 15. Layer 30 defines a forward facing surface 32 and a rear facing surface 34. Rear surface 34 is disposed adjacent to forward surface 22 of reflective layer 20.

Reflective layer 20 may be adhered to rear surface 34 of light diffusing layer 30 by any suitable means, such as metallic deposition or using transparent adhesive, etc. If an adhesive is used, it should be an optically transparent formulated adhesive that is transparent to light. Reflective layer may alternatively be applied to the rearward facing surface 34 of light diffusing layer 30 or to forward facing surface 17 of substrate 15 by vacuum metalization. The preferred materials which constitute layer 20 are silver or aluminum. Still further, reflective layer 20 may be a metal film such as aluminum, and may have a high polished mirror finish, a matte finish or any other surface treatment deemed desirable by one of skill in the art.

The light diffusing layer 30 is preferably fabricated of a resin such as polyethylene, polypropylene or other material which will permit light energy to enter through forward facing surface 32 and to be reflected by reflective layer 20 back through light diffusing layer 30 but in a manner which will increase the viewing angle of the reflected image such that the image can be seen from a wide angle relative to a line I representing a projected image light ray or wave projected at screen 10.

The higher the angle of diffusion, the wider the angle of viewing that will be perceived by those watching the image reflected by the screen. Normally, increasing the angle of diffusion results in a decrease in the luminance of reflected light. The make-up and physical contouring of light diffusing layer 30 is chosen so as to maximize the diffusion angle while also maximizing the luminance of reflected light. Simultaneously, the contrast of the reflected image should be kept as high as possible for greater picture clarity. An ideal range of thickness of light diffusing layer 30 is between 2–8 mils.

The ambient light characteristics, as well as the light intensity of the projected image, dictate the particular characteristics chosen for the light diffusing layer 30. Under conditions where less diffusion is required such as in a setting where the viewing angle does not need to be as great, polyethylene can be used as a constituent of light diffusing layer 30. For viewing settings where a greater angle of diffusion is desired, polypropylene can be used as a constituent of light diffusing layer 30. The forward surface 32, or the rearward surface 34, or both, of light diffusing layer 30 can be treated and/or contoured as by random embossing, micro lensing, sandblasting or any equivalent thereto indicated as reference number 35 in FIG. 1. Treatment 35 effects the magnitude of diffusion of the reflected image exiting light diffusing layer 30.

Figure 2:
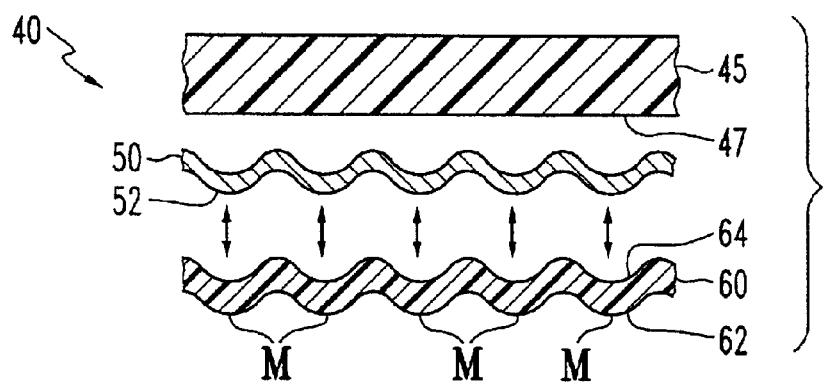
FIG. 2 is a cross-sectional, elevational, exploded view of an alternative embodiment of the invention.
Figure 3:
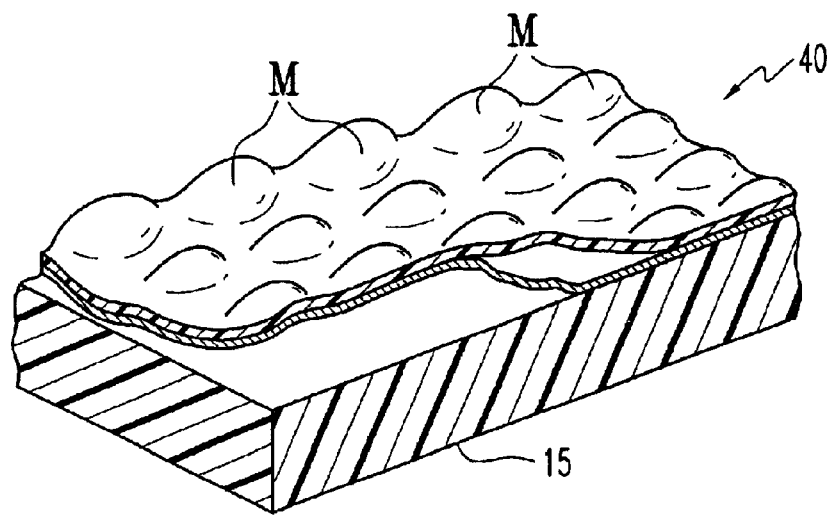
FIG. 3 is a perspective, partial cutaway, view of the alternative embodiment shown in FIG. 2.
Figure 4:
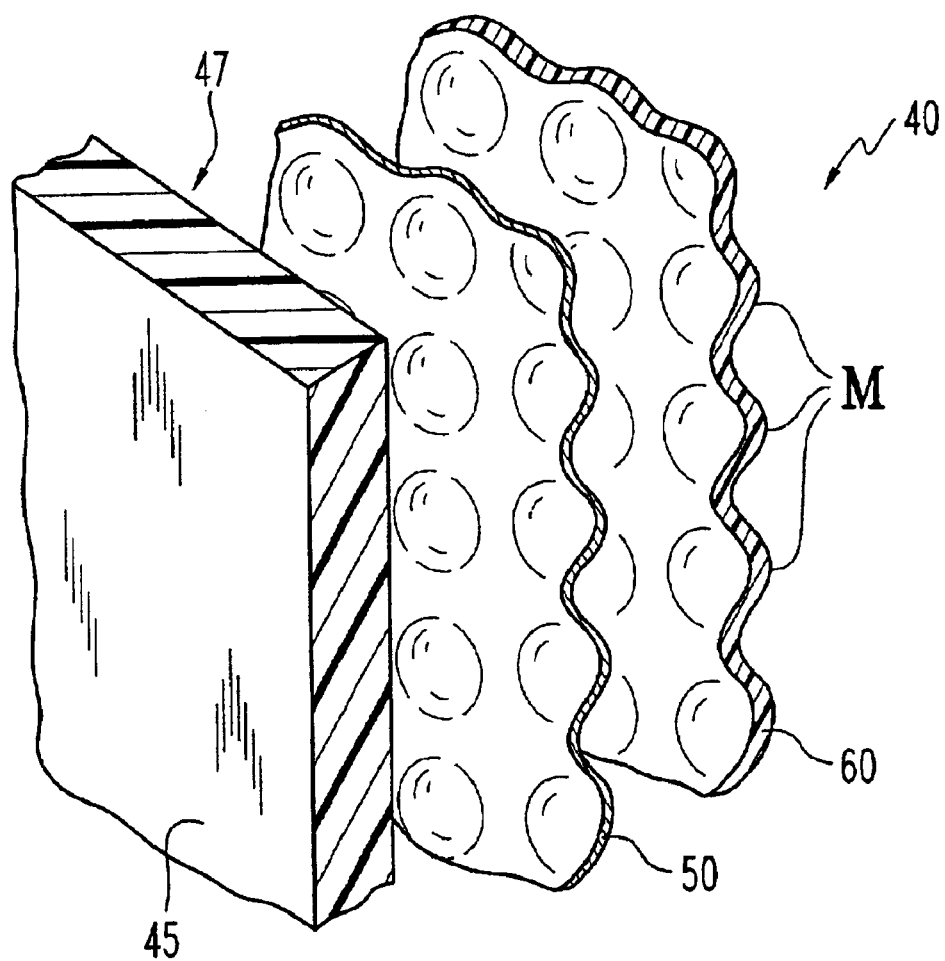
FIG. 4 is a perspective exploded partial cutaway view of the alternative embodiment of FIGS. 2 and 3.

As seen in FIGS. 2–4, an alternative or second embodiment of the invention comprises a front projection screen 40 in which a substrate 45, which may be similar to that described in connection with FIG. 1, is provided, and which defines a front surface 47. A reflective layer 50 is employed, also as disclosed in connection with FIG. 1, including forward facing reflective surface 52. A light diffusing layer 60 is employed, which defines forward surface 62 and rear surface 64. In this alternative embodiment, layer 60 defines a plurality of micro lenses M, which are, preferably, concavities in the shape of semi spheres, prisms, parabaloids, or any other raised structure which functions as a lens or prism with respect to light incident thereupon. Layer 50 may be laminated to inner surface 64 of light diffusing layer 60 (or to forward facing surface 47 of substrate 45) by a transparent adhesive (not shown), by vacuum deposition, or any other technique which will occur to one of skill in the art. Layer 50 may be made of any of the compositions discussed in connection with layer 20 of FIG. 1. Micro lenses M may be formed in light diffusing layer 60 by ultra etching, embossing, hot stamp rolling, or any other forming technique which will yield small lens-shaped concavities or solid embossed light-refracting elements therein. Micro lenses M may also be formed in other shapes, such as micro prisms, similar to those manufactured by Reflexsite Corporation.

The dimensions of the micro lenses such as a radius of curvature for curved lenses M, or the height and slope of sides if micro prisms are used, can be varied to effect the diffusion properties of diffusion layer 60. A larger radius of curvature, or a shallower slope, respectively, will yield smaller diffusion angles, and smaller radii of curvature, or steeper prism slopes, respectively will yield larger diffusion angles. For a home projection television, a higher diffusion angle is preferred while in a movie theater setting a lower diffusion, higher concentrated, light reflectivity could be tolerated.

The luminance of reflected light, i.e. gain, of reflective layers 20 and 50 can be made lower for home television applications, while the same characteristics of screens 10, 40, respectively, can be increased for the commercial, e.g. movie theater, application.

It is to be understood that the particular surface treatments and/or contouring of light diffusing layers 30 and 60 herein can be brought about by any suitable means which will occur to one of skill in the art. The addition of protective films (not shown) over the outer surfaces 32, 62 of light diffusing layers 30, 60, respectively, is also contemplated to be within the scope of the invention, if desired.

Screens as disclosed herein are suitable for use in dark or full daylight conditions, and provide visual performance characteristics not hereto before known. It is to be understood that variations in materials and dimensions are contemplated to be within the scope of this invention without departing without the spirit hereof.

Figure 5:
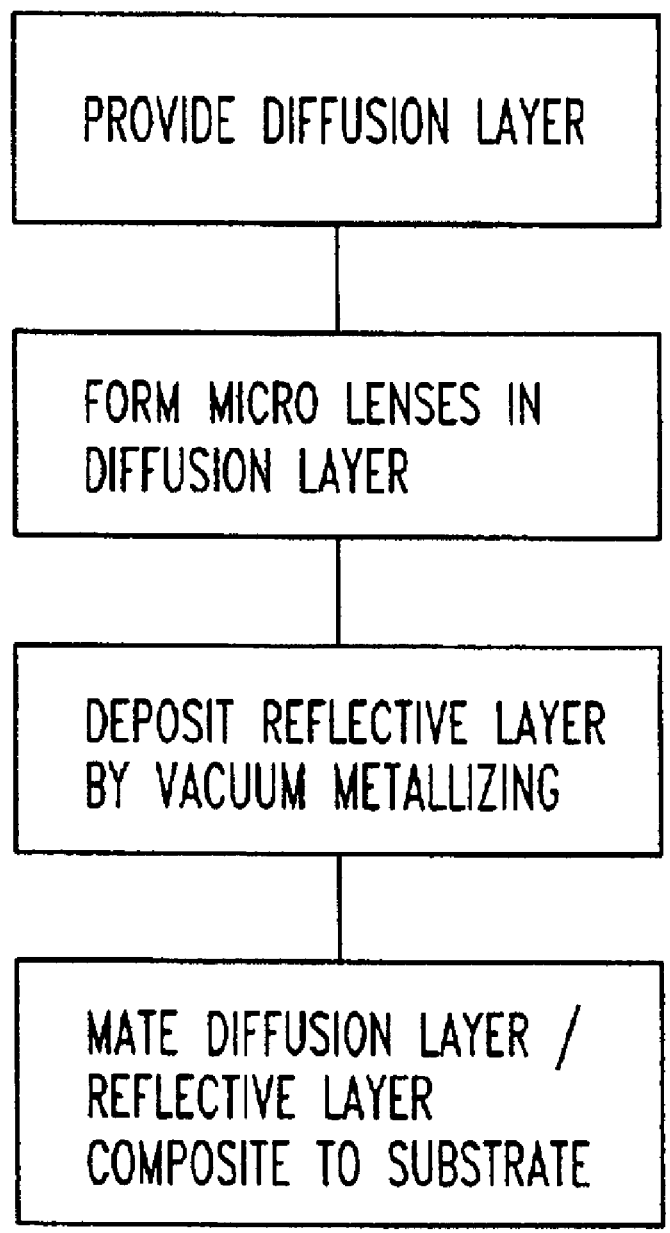
FIG. 5 is a flow diagram of the method of the invention.

A method, depicted schematically in FIG. 5, is also disclosed for creating the screen of this invention, comprising the steps of: providing a suitable diffusion layer; forming micro lenses in the diffusion layer; depositing the reflective later thereon; and mating the diffusion layer/reflective layer composite to the substrate. In this way, very inexpensive yet high performance projection screens in conformance with the invention can be provided.

Various modifications and alterations of this inventions will become apparent to those skilled in the art without departing from the scope and spirit of this invention, and it is understood that this invention is not limited to the illustrative embodiments set forth hereinbefore.

What is claimed is:

1. A projection screen comprising:

a substrate defining a flat forward surface;

a diffusion layer formed of a plurality of generally equally spaced apart concave features forming micro lenses;

a layer of reflective material deposited on a rearward facing surface of the diffusion layer; and the diffusion layer having a thickness greater than one one-thousandth of an inch (one mil) and being laminated to the forward surface of the substrate so that the layer of reflective material is sandwiched there between.

2. The projection screen of claim 1, wherein the micro lenses are in the shape of semi-spheres.

3. The projection screen of claim 1, wherein the micro lenses are circular when viewed in plan.

4. The projection screen of claim 1, made by a method comprising the steps of:

providing the substrate;

depositing the reflective material onto the rearward facing surface of the diffusion layer; and laminating the forward surface of the substrate to the layer of reflective material in such a way that the layer of reflective material is sandwiched therebetween.

5. The projection screen of claim 1, wherein the diffusion layer is a resin.

6. The projection screen of claim 1, wherein the resin is one of polyethylene and polypropylene.

7. The projection screen of claim 1, wherein the thickness of the diffusion layer is in the range of 2 mils to 8 mils.

8. The projection screen of claim 1, wherein the layer of reflective material is a layer of metalized film.

9. The projection screen of claim 1, wherein a directivity along a vertical axis relative to a normal line passing perpendicularly through a center of the projection screen is the same as a directivity along a horizontal axis relative to said normal line.

10. A projection screen comprising:

a support material having a forward surface;

a diffusion layer defining a plurality of micro lenses and having a thickness greater than one one-thousandth of an inch (one mil);

a reflective film deposited on an inward facing surface of the diffusion layer;

the micro lenses being comprised of a plurality of equally spaced apart circular convex projections; and the reflective film being deposited on the diffusing layer so as to conform to the contours of the inward facing surface of the diffusing layer including the micro lenses.

11. A projection screen produced by the steps of:

providing a substrate defining a flat forward surface;

providing a diffusion layer that includes a plurality of generally equally spaced apart concave features forming micro lenses;

disposing a reflective material onto a rearward facing surface of the diffusion layer; and laminating the forward surface of the substrate to the layer of reflective material such that the layer of reflective material is sandwiched between the diffusion layer and the substrate.

12. The projection screen of claim 11, wherein the diffusion layer has a thickness of greater than one one-thousandth of an inch (one mil).

13. The projection screen of claim 12, wherein the thickness of the diffusion layer is in the range of 2 mils to 8 mils.

14. The projection screen of claim 11, wherein the micro lenses are in the shape of semi-spheres.

15. The projection screen of claim 11, wherein a directivity along a vertical axis relative to a normal line passing perpendicularly through a center of the projection screen is the same as a directivity along a horizontal axis relative to said normal line.

16. The projection screen of claim 11, wherein the micro lenses are circular when viewed in plan.

17. The projection screen of claim 11, wherein the diffusion layer is a resin.

18. The projection screen of claim 17, wherein the resin is one of polyethylene and polypropylene.

19. The projection screen of claim 11, wherein the layer of reflective material is a layer of metalized film.

20. A method for fabricating a projection screen comprising:

providing a substrate defining a flat forward surface;

providing a diffusion layer that includes a plurality of generally equally spaced apart concave features forming micro lenses;

disposing a reflective material onto a rearward facing surface of the diffusion layer; and laminating the forward surface of the substrate to the layer of reflective material such that the layer of reflective material is sandwiched between the diffusion layer and the substrate.

* * * * *